E. W. Hopkins,
Milking Stool.
No. 91,336.    Patented June 15, 1869.
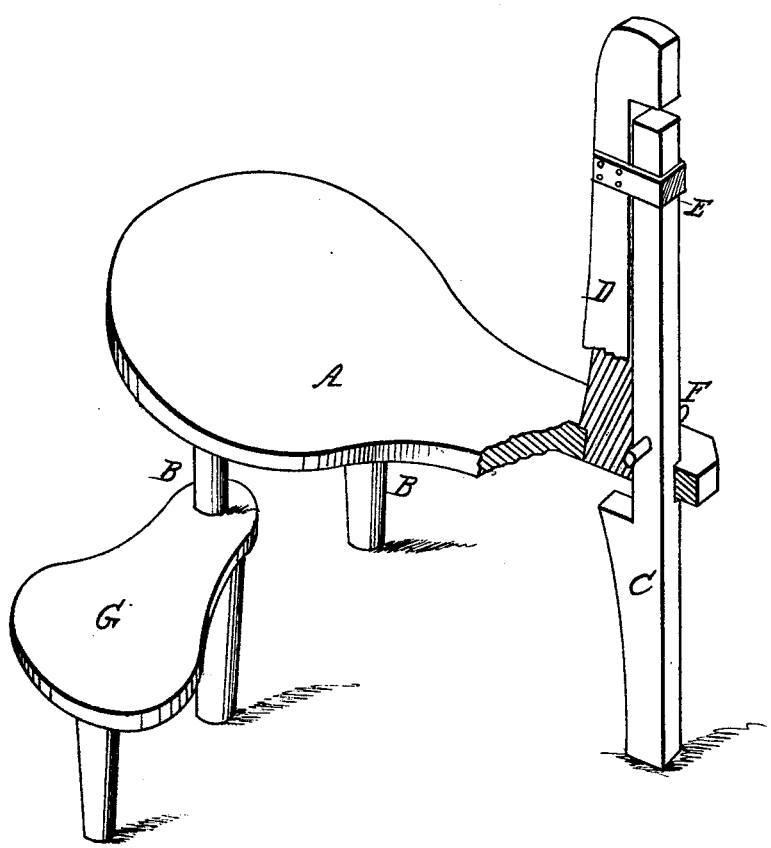
Witnesses
Hinchman
Jno. A. Brooks
Inventor
E. W. Hopkins
per Munn & Co
atty

ERASTUS W. HOPKINS, OF ONEONTA, NEW YORK.

Letters Patent No. 91,336, dated June 15, 1869.

IMPROVEMENT IN MILKING-STOOL.

The Schedule referred to in these Letters Patent and making part of the same.

*To all whom it may concern:*

Be it known that I, ERASTUS W. HOPKINS, of Oneonta, in the county of Otsego, and State of New York, have invented a new and improved Milking-Stool; and I do hereby declare that the following is a full, clear, and exact description thereof, which will enable others skilled in the art to make and use the same, reference being had to the accompanying drawing, forming part of this specification.

This invention relates to improvements in milking-stools, designed to provide a simple and efficient means for securing the cow's tail while milking; also, an improved arrangement of pail-holding attachment.

The drawing represents a perspective view of my improved stool, partly broken.

A represents the seat, having two fixed legs, B, so arranged that the sitter may balance thereon readily, to raise the elongated portion of the said seat.

C represents a leg rising up through the seat by the side of a vertical arm, D, fixed to the seat, and having a guide-band, E, taking around the leg C, near the upper end; also having a shoulder above the top of the post.

The post is free to slide in the seat, and provided with a pin, F, to prevent it sliding out of the seat, when the stool is carried in the hand.

G represents an adjustable pail-rest, supported on one of the legs, B, so as to turn freely thereon, to be adjusted to any position, and provided with a leg at its free end.

When the operator sits down upon the seat, he may readily so balance himself on the legs as to raise the leg C off the ground, permitting him to place the long hairs of the tail between the top of the leg C and the shoulder of the arm D, where they will be instantly and firmly clamped, by balancing in the opposite direction, to press the leg C upon the ground.

Having thus described my invention,

What I claim as new, and desire to secure by Letters Patent, is—

The combination, with the seat, arranged to balance on the legs B, of the sliding leg C and arm D, when arranged substantially as specified.

ERASTUS W. HOPKINS.

Witnesses:
PETER W. GILE,
JAMES VAN DUSEN.